United States Patent
Whinnery, Jr.

(10) Patent No.: US 6,461,550 B1
(45) Date of Patent: Oct. 8, 2002

(54) METHOD FOR FORMING A UNIFORMLY DENSE POLYMER FOAM BODY

(75) Inventor: Leroy Whinnery, Jr., Danville, CA (US)

(73) Assignee: Sandia National Laboratories, Livermore, CA (US)

( * ) Notice: Subject to any disclaimer, the term of this patent is extended or adjusted under 35 U.S.C. 154(b) by 0 days.

(21) Appl. No.: 09/916,844

(22) Filed: Jul. 26, 2001

(51) Int. Cl.[7] .............................. C08J 9/232; C08J 9/32
(52) U.S. Cl. ...................... 264/45.4; 264/126; 521/54; 521/56; 521/59
(58) Field of Search ................ 264/45.4, 126; 521/54, 56, 59

(56) References Cited

U.S. PATENT DOCUMENTS 3,615,972 A * 10/1971 Morehouse, Jr.
4,433,068 A * 2/1984 Long et al.

* cited by examiner

*Primary Examiner*—Morton Foelak
(74) *Attorney, Agent, or Firm*—Timothy P. Evans

(57) ABSTRACT

A method for providing a uniformly dense polymer foam body having a density between about 0.013 $g/_{cm3}$ to about 0.5 $g/_{cm3}$ is disclosed. The method utilizes a thermally expandable polymer microballoon material wherein some of the microballoons are unexpanded and some are only partially expanded. It is shown that by mixing the two types of materials in appropriate ratios to achieve the desired bulk final density, filling a mold with this mixture so as to displace all or essentially all of the internal volume of the mold, heating the mold for a predetermined interval at a temperature above about 130° C., and then cooling the mold to a temperature below 80° C. the molded part achieves a bulk density which varies by less then about ±6% everywhere throughout the part volume.

8 Claims, 7 Drawing Sheets

METHOD FOR FORMING A UNIFORMLY DENSE POLYMER FOAM BODY

STATEMENT OF GOVERNMENT INTEREST

This invention was made with support under United States Government contract no. DE-AC04-94AL85000 awarded by the U.S. Department of Energy to Sandia Corporation. The Government has certain rights in the invention.

FIELD OF THE INVENTION

This invention generally pertains to formulations and methods for producing expanded polymeric bodies (foams). More particularly, the present invention recites formulations and methods for producing low density expanded polymeric bodies which are uniformly dense from edge-to-edge, and specifically where the nominal density varies by less than about ±6% across any cross-section of the body.

BACKGROUND OF THE INVENTION

Many polymer formulations are known in the art for providing polymeric foam structures. In particular, porous polymeric foams have been produced by a wide variety of techniques ranging from leaching a soluble filler phase through providing an internally generated gas-producing phase, to utilizing emulsion-derived phase separation techniques. Some of the most commercially important polymer systems are drawn to polyurethane foams. A large body of information relating to the preparation of rigid and flexible polyurethane foams has been published over the years. For example, Windemuth in U.S. Pat. No. 2,948,691 issued on Aug. 9, 1960 teaches that flexible polyurethane foams can be made from mixtures comprising aliphatic or aromatic isocyanates and polyols. Britain in U.S. Pat. No. 3,397,158 issued Aug. 13, 1968 and Hostettler in U.S. Pat. No. 3,398,106 issued Aug. 20, 1968 both describe an improvement in polyurethane foam making processes through the use of stannous octoate catalyst. Other important foam structures are derived from emulsion techniques, such as are described in U.S. Pat. Nos. 4,775,655 and 5,021,462 to Edwards, et al., and to Elmes, et al., respectively, in order to produce materials such as polystyrene, and polymethacrylonitrile. Finally, International Application WO 00/37547, published under the Patent Cooperation Treaty (PCT), discloses a method for producing thermally expandable polymeric microspheres and a material formed by expanding a quantity of the microspheres at an elevated temperature such that the walls of the expanded microspheres fused together.

However, none of the prior art discloses a method for providing an expanded foam body having a density which can be controlled edge-to-edge to within a small tolerance range. When these materials are prepared to produce a foam body, control of various physical parameters, such as the density of the end product, is problematic—typically limited to achieving a nominal average value, determined by trial and error. The end result is usually found to vary widely across a cross-section of the body. Furthermore, many of the materials used by the prior art methods, are messy, noxious, and/or toxic and require either an intense hand operation or sophisticated and expensive mixing/dispensing equipment in order to prepare the ingredients for generating the foam structures.

It would be desirable then to provide a method for providing a simple, clean, and inexpensive means for producing a foam structure having well controlled physical properties.

SUMMARY OF THE INVENTION

In the present invention, therefore, there is provided a method for preparing and producing a constrained foam structure having well-controlled dimensional tolerances, and density, especially with regards to density gradients near a mold wall. A simple mixture of commercially available dry materials is provided. It is, therefore, an object of the present invention to provide a method for preparing an organic foam structure having an internal density variation of less than about ±6% of the nominal bulk density of the gross structure.

Yet another object of the present invention is to provide a composition for providing an organic foam structure having an internal total density gradient of less than about 12% of the nominal bulk density everywhere within the foam structure.

Another object of the present invention is to provide a composition comprising a first fraction of expanded and a second fraction of unexpanded thermally expandable polymeric microballoons.

DETAILED DESCRIPTION OF THE INVENTION

The present invention, as disclosed and described below, provides a method for using a commercially available product to prepare a strong, uniformly dense foam body, wherein the density range of the body is selectable over a range from about 0.013 $g/cm^3$ to about 0.5 $g/cm^3$. The material used is a thermally expandable microballoon polymer product known by the tradename of EXPANCEL® microballoons. The material is made from a copolymer of polyacrylonitrile (PAN) and polymethacrylonitrile (PMAN) using isopentane as the blowing agent. Other materials are equally useful such as those described in International Application WO 00/37547, incorporated herein by reference, however, the EXPANCEL® product is inexpensive and readily available from the manufacturer, EXPANCEL, Inc., whose offices and production facilities are located in Duluth, Ga.

The EXPANCEL® material is used commercially as an inexpensive filler in a wide range of applications including:

printing inks, coatings, sealants, thermoplastic extruding and injection molding, shoe soles, stiffening agent for paper products, etc. The product has the consistency of a fine powder in the expanded and unexpanded forms.

The designation for the chosen material was 091DU and 091DE. (The designation "D" indicates that the powder is dry. The designations "U" and "E" indicate whether the powder is unexpanded or expanded, respectively.) EXPANCEL, Inc. screens the unexpanded powder to provide several size fractions. Only the smallest size fraction was used in order to produce a part with the smallest possible cell size.

The original plan to make a foam body involved placing dry, unexpanded EXPANCEL® powder, in the absence of a resin or binder, into a metal mold (sealed, but not airtight) and heating the mold above the $T_g$ (the "glass-transition" temperature, or the inflection point in the experimental curve of modulus vs. temperature of a polymeric body) of the polymer microballoons. This approach allows the internal pressure of the microballoons to expand the softened polymer as usual, and fill the volume of the mold. We are relying on the microballoons to tack themselves together due to the polymer being above its $T_g$ and the microballoons pressing into each other in the constrained environment of the mold.

Figure 1:
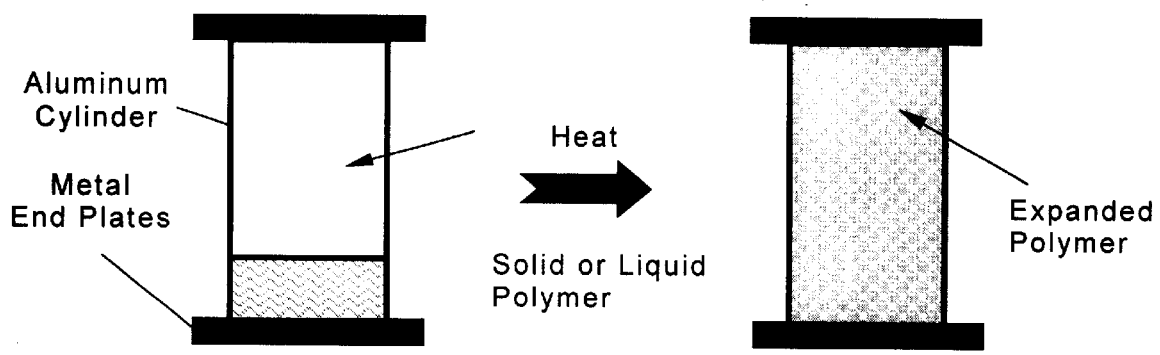
FIG. 1 illustrates a schematic of a typical prior art molding technique used for providing a molded foam body.
Figure 2:
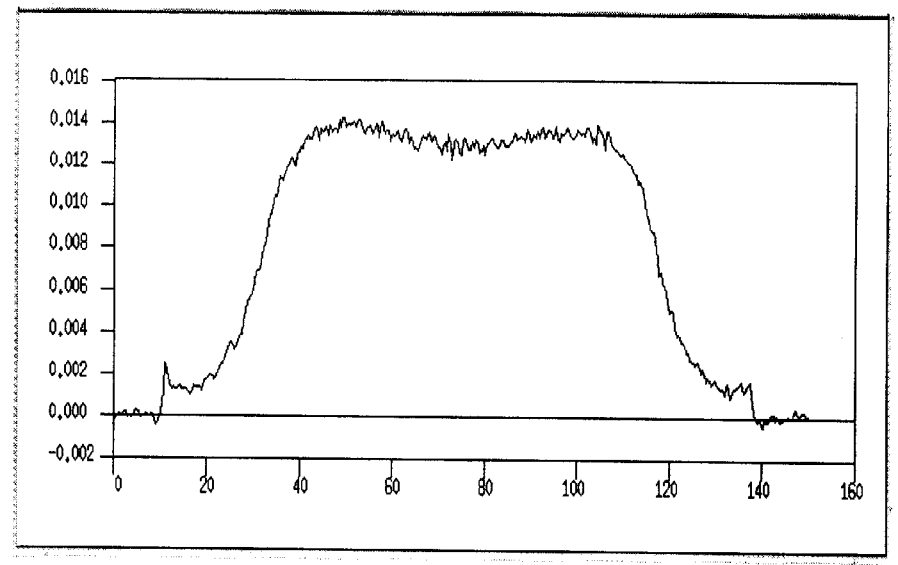
FIG. 2 shows a radiograph of the foam body provided by the technique shown in FIG. 1 and a CCD scan of the radiograph illustrating the variations in density of these part.
Figure 5E:
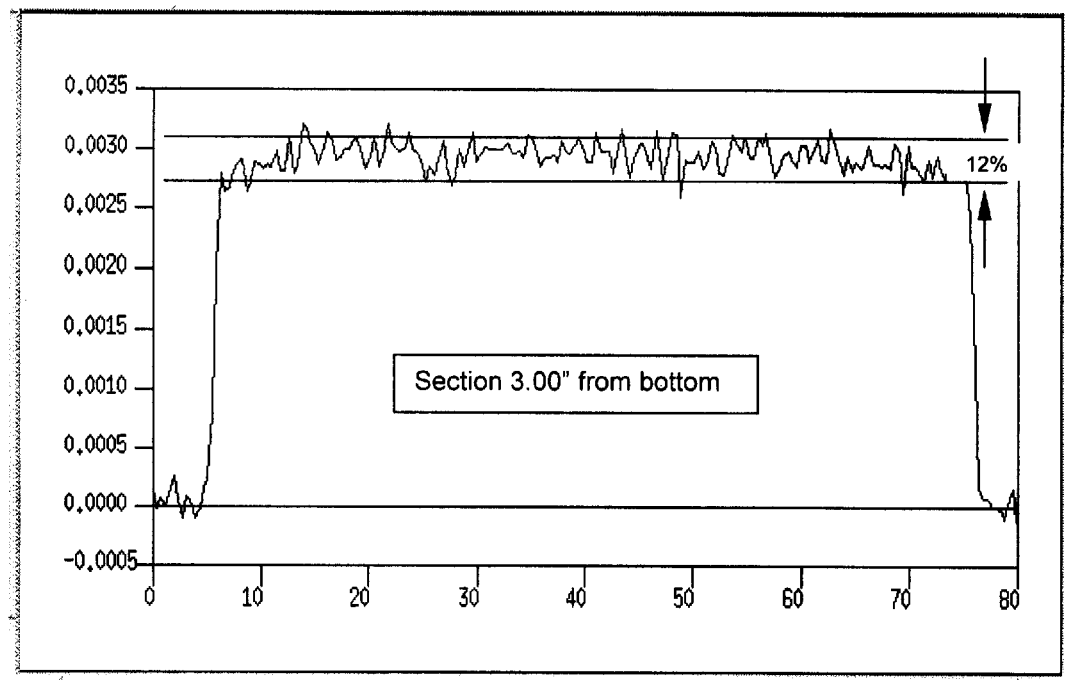
FIGS. 5A–5E show CCD scans of radiographs of 7 cm diameter cylinders made by the "zero-rise" process of the present invention and shown at indicated intervals throughout the part in order to check the density variation. The molded part has a nominal density of 0.16 $g/cm^3$.

The first attempt at preparing such a body is shown in FIG. 1. Enough unexpanded EXPANCEL® powder was introduced into a right circular cylindrical mold such that when heated, the expanded foam would fill the mold volume and thereby provide a final part having the desired bulk density of 0.18 $g/cm^3$. The results from this first attempt appeared to be promising, in that a monolithic part with good mechanical integrity was produced. However, radiographic analysis, shown in FIG. 2, showed substantial density gradients with lower density foam around the perimeter of the cylinder and a higher density zone in the center of the part. These gradients are consistent with the EXPANCEL® powder closest to the mold getting hot first and expanding first. It is surmised that by the time the material in the center of the cylinder is above the $T_g$ of the polymer, virtually all of the free volume within the mold is gone and the microballoons toward the middle of the mold cannot expand resulting in the observed density gradient across the molded part.

The solution to this problem forms the basis for the present invention. It has been discovered that by combining different fractions of the unexpanded and expanded microballoons so as to achieve the desired final part density, and by processing this mixture using a "zero-rise" approach, foam parts could be produced having edge-to-edge density uniformity of at least about ±6% of the nominal bulk density. It is believed that due in large part to the low densities of the demonstration parts and a number of additional factors the actual density range of these part was better than the observed measurements. Most of the variation is believed to be noise associated with the measurement instrumentation which is designed for use with metal parts.

Figure 3:
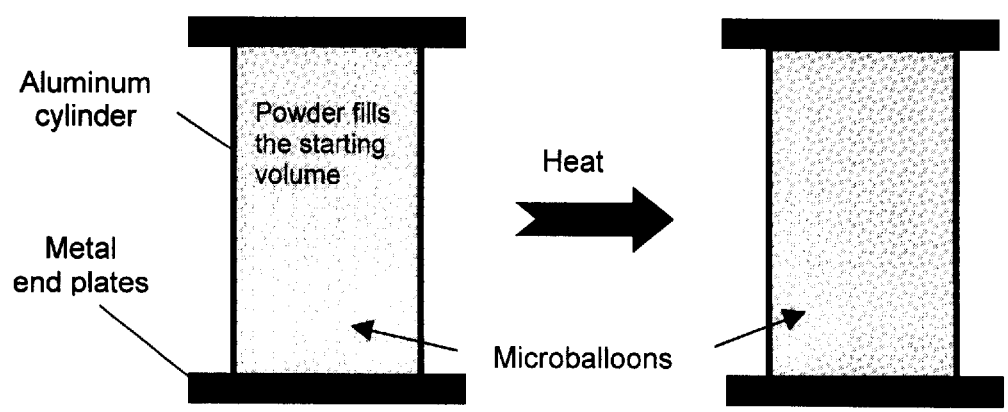
FIG. 3 shows a schematic of the "zero-rise" molding process of the present invention.

Our Process is Described Generally as Follows:

The two types of EXPANCEL® microballoons (091DU and 091DE) are combined in a ratio such that the density of the volume of mixed powders contained within the mold is the same as the desired density of the final part. This "zero-rise" approach is implemented by completely filling the mold, as shown in FIG. 3, with the powder mixture. This approach has the effect of, upon heating, allows only for expansion of the microballoons (mostly the fraction of unexpanded microballoons) to fill the interstitial regions between individual spheres such that no macroscopic movement of the bulk powder results. In addition, the process may also include an agitation step when filling the mold, but if agitation is used, the same parameters of agitation are required when determining the mix ratios of the starting powders.

PROCESSING EXAMPLE AND BEST MODE

Monolithic parts using the EXPANCEL® powder were prepared as described below. Prior to making a part, different fractions of expanded and unexpanded powders were measured and thoroughly mixed. Mixing was accomplished by placing predetermined amounts of each powder into a 4-liter, wide-mouth polyethylene jar fitted with internal baffles, helical fins, or the like, in order to ensure good mixing. The loaded jar is closed with a lid, placed on a rolling mill, and rotated about the axis of the jar for 3–5 hours. However, since the bulk density of each type of powder must be measured in order to properly calculate the necessary weight fraction of each powder used, and because these powders do not compact uniformly when dispensed into a known volume, it was necessary to establish a consistent method for handling both the mixed and unmixed powders so as to provide for an accurate measure of the density of each.

Table 1 below, shows the extent to which the compacted volume of the individual constituents can be effected by mechanical agitation. The pour densities were determined by measuring the mass of the powder required to fill a 100 cc graduated cylinder. The tap densities were determined by tapping the graduated cylinder 50 times on the counter and recording the reduced volume occupied by the powder. Vibration densities were obtained by recording the volume occupied by the powder after the time interval and power level of a SYNTRON JOGGER®, model J-1, electromechanical vibration table.

TABLE 1

POUR, TAP AND VIBRATION DENSITIES OF
UNEXPANDED AND EXPANDED EXPANCEL®

|  | 091DU (44.68 g) | | 091DE (0.97 g) | |
| --- | --- | --- | --- | --- |
|  | Volume (cm$^3$) | Density (g/cm$^3$) | Volume (cm$^3$) | Density (g/cm$^3$) |
| Pour | 100 | 0.447 | 100 | 0.0097 |
| Tap (50 times) | 96 | 0.47 | 91 | 0.012 |
| Vibrate (Power Level #4, 1 minute agitation) | 93 | 0.480 | 78 | 0.0124 |
| Vibrate (#8, 2 min) | 87 | 0.514 | 75 | 0.0129 |
| Vibrate (#8, 4 min) | 86 | 0.519 | 74 | 0.0131 |

In all cases, whichever method is used to establish the bulk density of the starting powder, the same method is used to when filling the mold with the powder mixture, i.e., if a powder density is determined by simply pouring one of the two powders into a known volume then the mixed powder should be pour into the mold.

The desired density of the final part and the densities of the starting powders determined the weight ratio of each of the powders. An example of how this ratio is determined, and the respective quantities of each powder derived from this calculation, is shown in Table 2 below. The selection of the appropriate density (pour, tap, or vibration) is determined by the method used to load the mixture of powders into the mold (pour, tap or vibration).

TABLE 2

EXAMPLE CALCULATION FOR DETERMINING THE RATIO AND
AMOUNTS OF EACH POWDER TO PROVIDE A GIVEN DENSITY
AND BATCH SIZE
DENSITY OF DESIRED
FINAL PART = 0.20 g/cm³

Compacted Densities (Power Level #8, 4 minute agitation)
    EXPANCEL ® 091DE 0.013 g/cm³
    EXPANCEL ® 091DU 0.52 g/cm³
    Mold vol. = 500 cm³. At a desired target density of 0.2 g/cm³, the
    batch weight will add to 100 g total (500 cm³ × 0.20 g/cm³
Ratio calculation for density = 0.20 g/cm³
    Let x = volume % 091DE, then:
    0.013x + 0.52 (1 − x) = 0.20
        Solving the above equation, therefore, results in x being equal
    to 0.63, i.e., 63% of the volume of the batch is 091DE and 37%
    of the batch volume is 091DU)
091DE
    063 × 500 cm³ = 315 cm³
    0.013 g/cm³ × 315 cm³ = 4.10 g of 091DE
091DU
    0.37 × 500 cm³ = 185 cm³
    0.52 g/cm³ × 185 cm³ = 95.9 g of 091DU As shown in FIG. 3 above, a simple hollow metal cylinder sitting on a metal plate forms the sides and bottom, respectively, of the mold used to prepare the foam bodies of the invention. After completely filling the mold with the mixture of powders, another metal plate was placed on top and the assembly clamped together to prevent the powders from pushing the lid off the mold as it is heated. The mold was then was then placed in an oven, for about 1 hour, at a temperature of about 150° C., after which the mold is allowed to cool. It was found that the mold must be cooled to below 80° C. before removing the clamp or the microballoons will continue to expand. It was also found that heating the microballoons for extended periods of time increased the tendency for the expanded microballoons to collapse in a process called "shrinkback."

Temperature was indicated on the surface of the mold and the interior is thought to remain considerably hotter than the exterior skin of the mold.

Figure 4B:
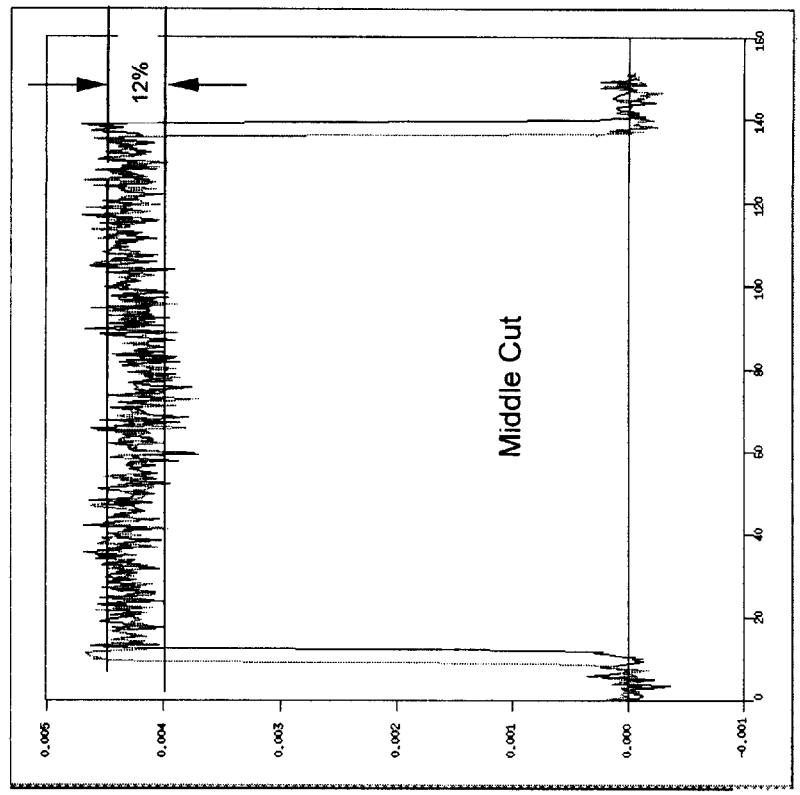
FIGS. 4A and 4B show CCD scans of radiographs of 13 cm diameter cylinders made by the "zero-rise" process of the present invention and having a density of 0.2 $g/cm^3$.
Figure 4A:
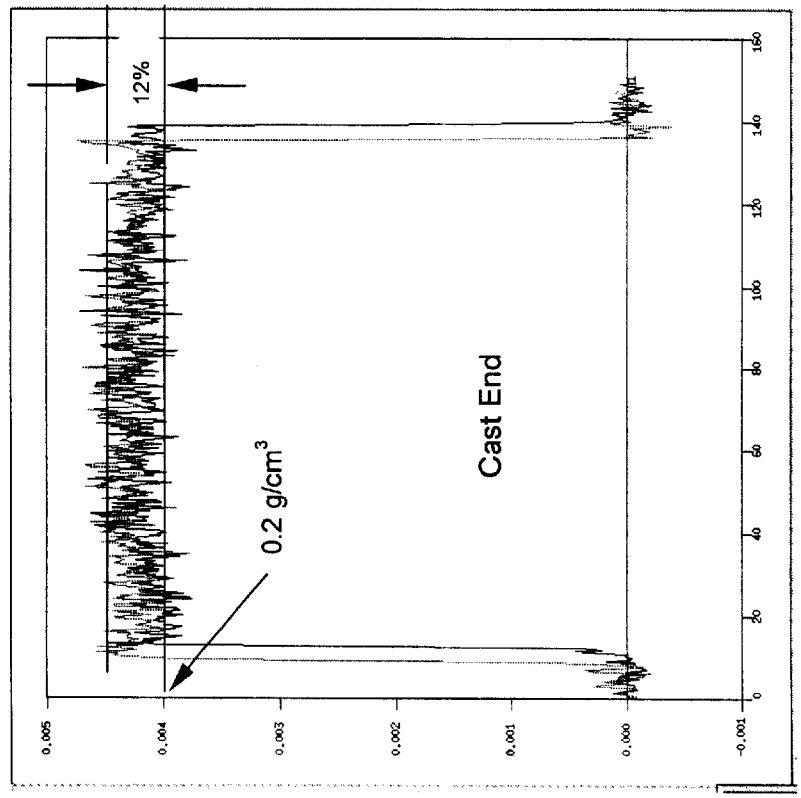
Figure 5A:
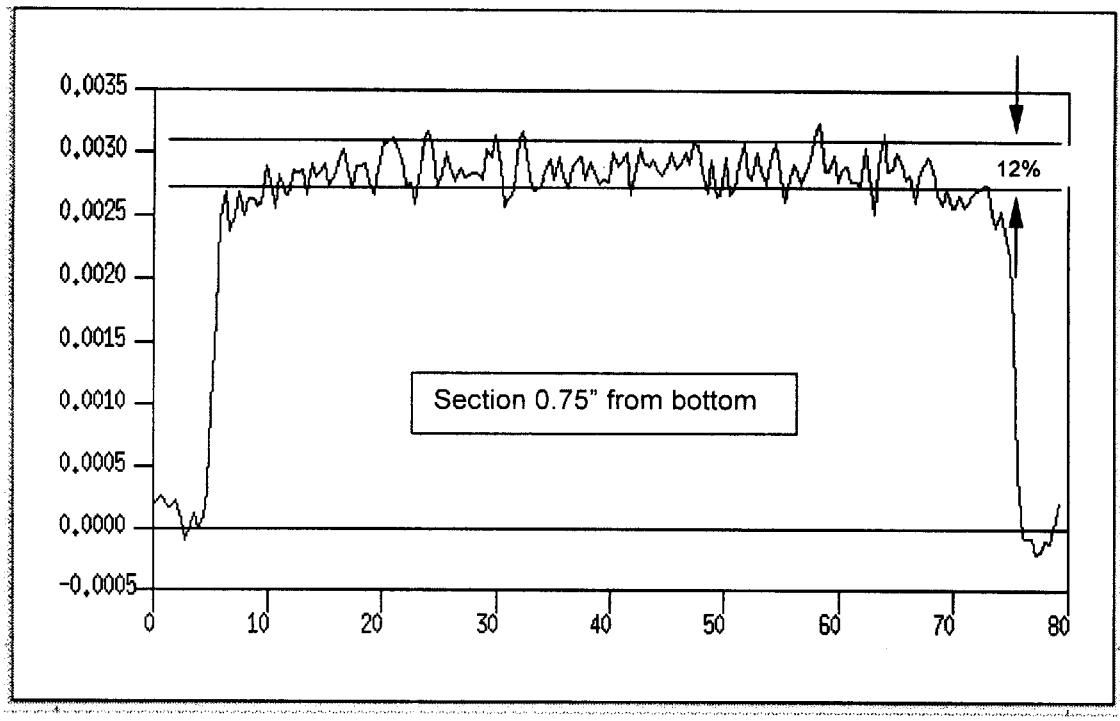
Figure 5B:
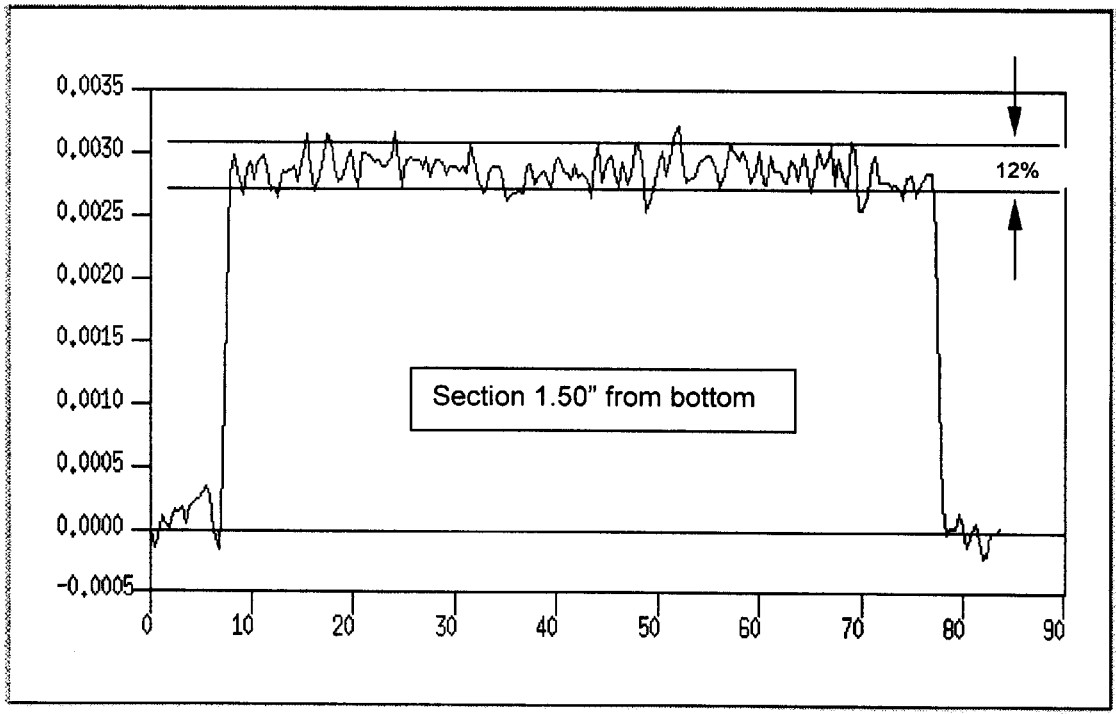
Figure 5C:
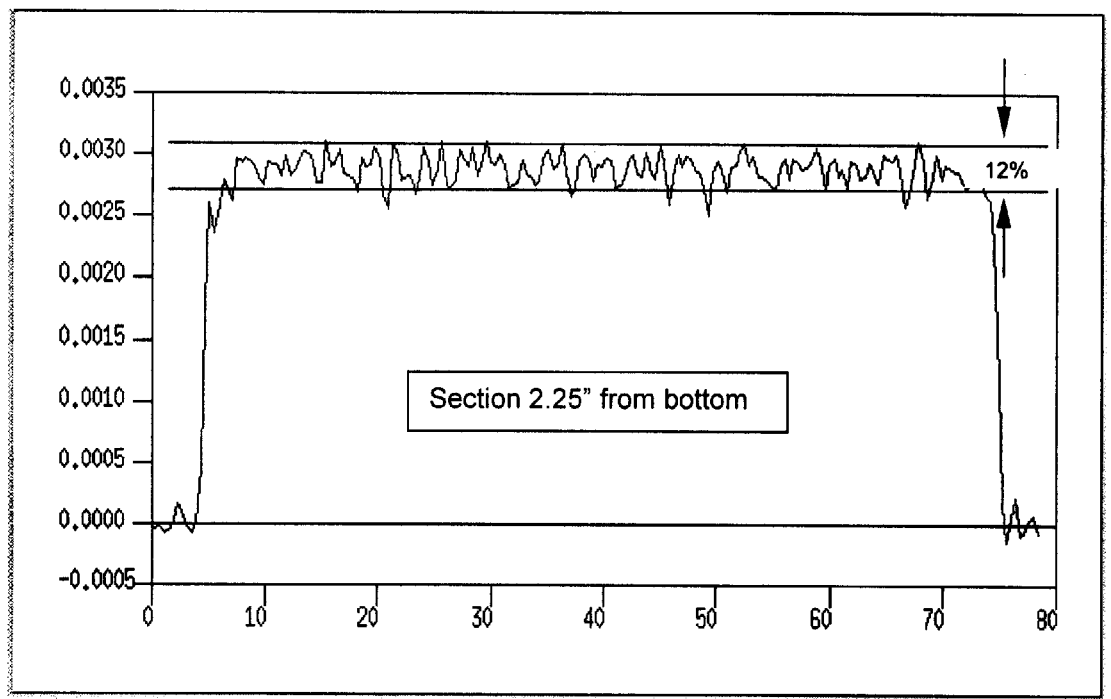
Figure 5D:
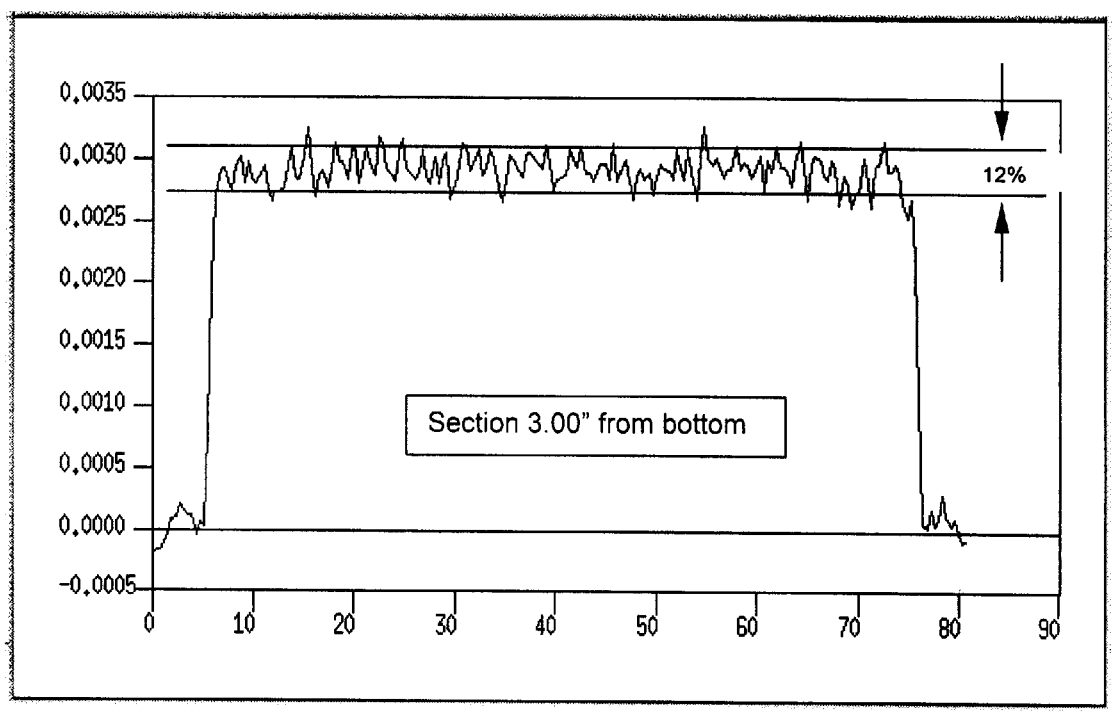

Many different parts were made for testing and evaluating this new technique including cylindrical parts from 7 cm diameter×10 cm high to 13 cm diameter×15 cm high, and densities varying between 0.013 $g/cm^3$ to 0.5 $g/cm^3$. (Small disk-shaped parts were also prepared consisting of disks that were 4 cm in diameter and either 0.3 cm or 0.5 cm high. A total of approximately 35 disks were prepared at densities of 0.08, 0.20 and 0.45 $g/cm^3$.) In order to quantify the density variations associated with each part, the prepared cylinders were radiographed multiple times using an x-ray tomography technique. The x-ray signal was detected by a scintillator coupled with a CCD detector and a digitized image generated consisting of a computer compilation of each data set of signals. The radiographic analysis of these parts exhibited density profiles, illustrated by FIGS. 4A and B and in FIGS. 5A–E. FIGS. 4A and 4B then, represent tomographic virtual "slices" of each half of a 13 cm cylinder which had been bisected perpendicular to the cylindrical axis. Data was measured at 1.3 cm from of each of the cut ends and 1.9 cm from the cast ends of the part, respectively. The nominal density of the part, as indicated in the FIGURE is 0.20 $g/cm^3$. FIGS. 5A–E represent a similar set of virtual tomographic "slices". In this case a 10 cm long by 7 cm diameter cylinder was cast at a nominal density of 0.16 $g/cm^3$ and radiographed. Each "slice" is a computer reconstruction of the cross section of the part at 1.9, 3.8, 5.7, 7.6, and 9.5 cm from one end of the cylinder. In each case, the radiographs are seen to illustrate the high degree of uniformity in the target density across each cross-sectional "slice" up to within well under a millimeter from the edge of the molded part.

Figure 6:
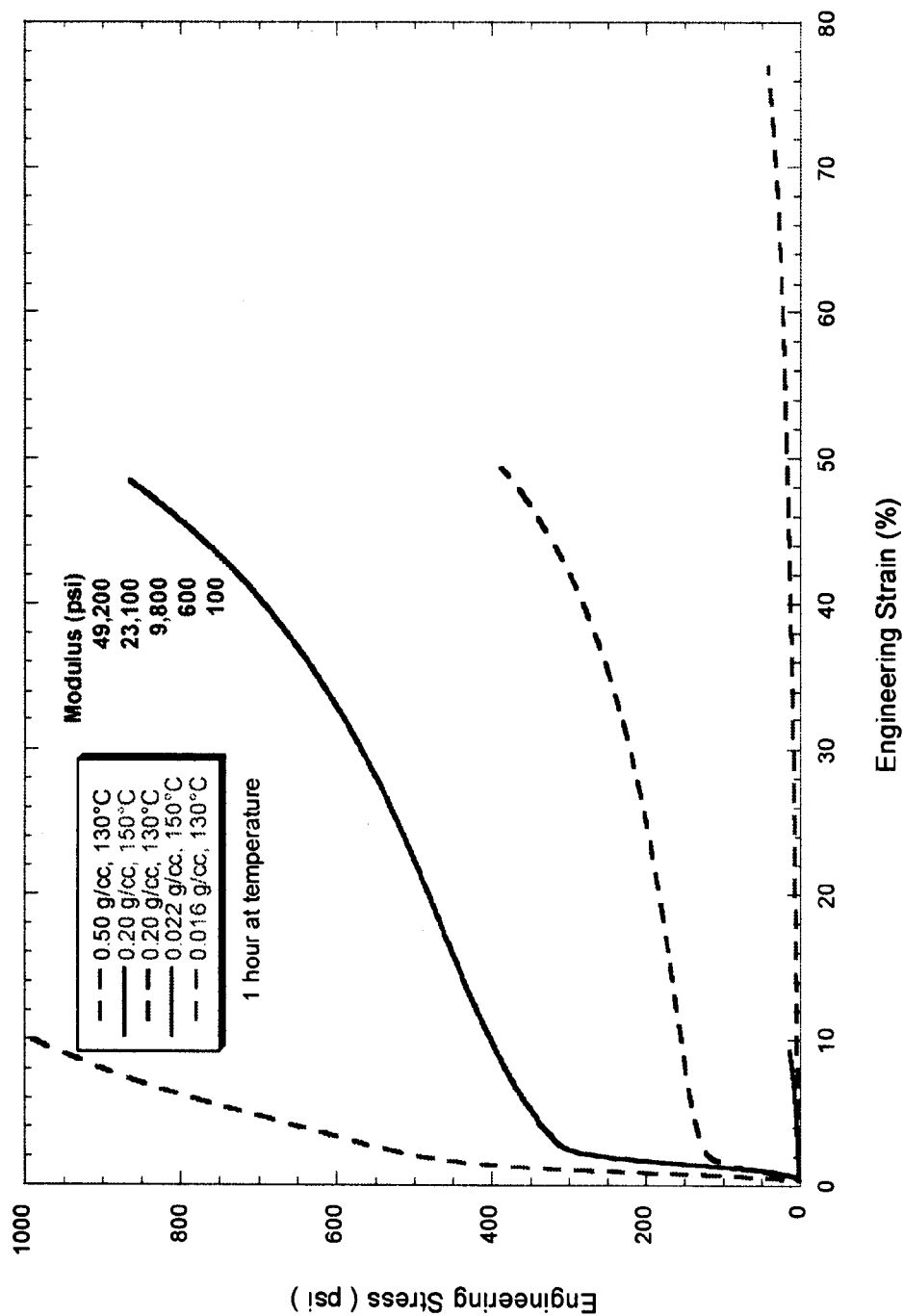
FIG. 6 shows a quasi-static uniaxial compression stress-strain response curve for various densities of the expanded foam bodies of the present invention prepared by heating the microballoons to 130° C. or 150° C. for 1 hour.
Figure 7:
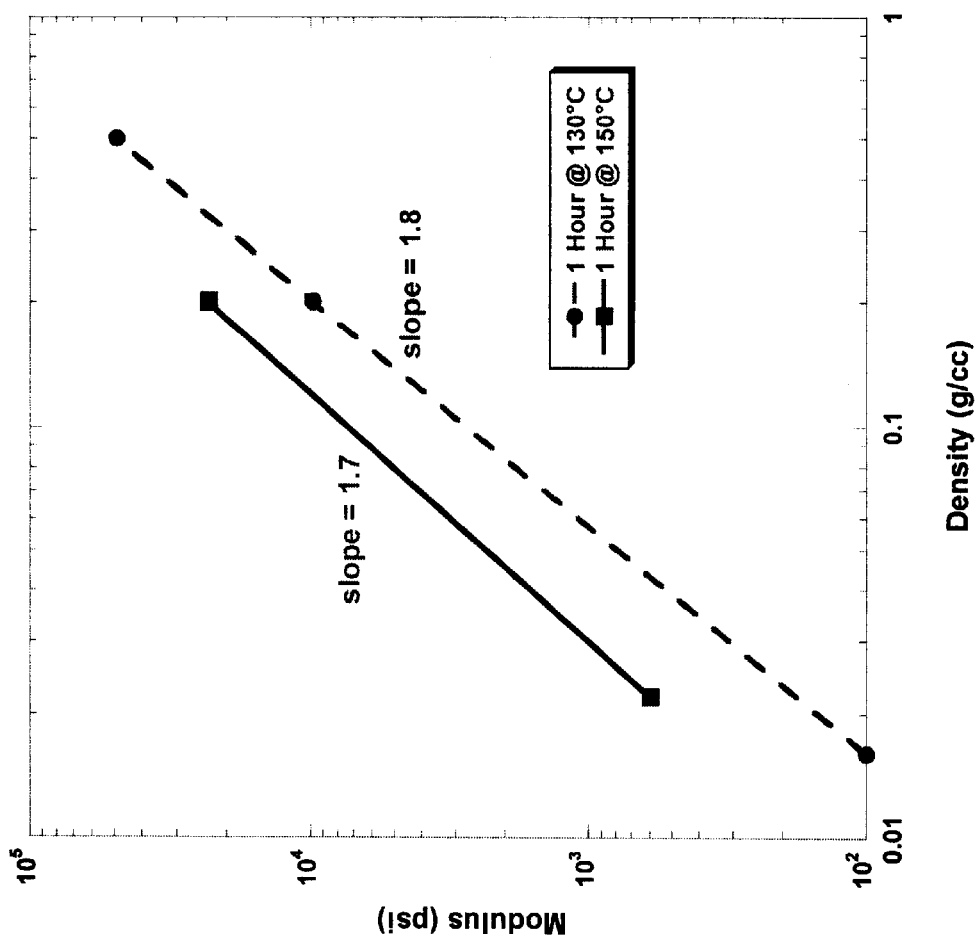
FIG. 7 shows a graph of the modulus vs. density of the expanded foam bodies of the present invention prepared by heating the microballoons to 130° C. or 150° C. for 1 hour.

Finally, while the mechanical properties of these foams are of only peripheral interest, they were used to determine the best temperature to heat the samples. Assuming no shrinkback, the best processing temperature to heat the sample, is the one that yields the highest strength and highest modulus values. Samples of the 0.3 cm thick×4 cm diameter disks were prepared and tested on an INSTRON® uniaxial test frame and data collected under quasi-static compression conditions. The mechanical data is summarized in FIG. 6 and suggests that samples prepared at 150° C. were stronger and had a higher modulus values than samples prepared at 130° C. FIG. 6 shows a quasi-static uni-axial compression stress-strain curves for various density foams prepared as described above and processed at either 130° C. or 150° C. for 1 hour. FIG. 7 shows not only that the higher temperature results in a higher modulus material, but that the slopes of the two different temperatures are similar to each other which is an indication that the foams are well-behaved.

We have therefore disclosed a method wherein use of a mixture of EXPANCEL® microballoon powders molded by a zero-rise process will produce an expanded polymeric foam structure which provides close control of the bulk density of the finished article. The invention, however, is not to be construed as limited to using only the EXPANCEL® microballoon powders. Those skilled in the art will recognize that any similar thermally expandable polymeric microballoon would function similarly to produce a uniformly dense molded part, if the microballoons are molded using the same zero-rise process.

What is claimed is:

1. A method for providing a uniformly dense expanded polymeric body, comprising the steps of:

providing a first polymer material consisting essentially of partially expanded thermally expandable microspheres and a second polymer material consisting essentially of unexpanded thermally expandable microspheres, combining said first and second polymer materials in respective first and second fractions in order to provide a polymer mixture having a predetermined bulk density;

dispensing a portion of said polymer mixture into an internal volume of a mold such that said polymer mixture displaces essentially all of said internal volume;

closing said mold;

heating said mold to a temperature above a polymer glass transition temperature for about one hour, said temperature causing said partially expanded and said unexpanded microspheres to soften and expand to fill the interstitial spaces between each of said microspheres, said temperature further causing surfaces of adjoining microballoon to fuse together providing thereby an expanded polymeric body;

cooling said mold to a temperature below less than 80° C.; and removing said expanded polymeric body from said mold to provide said molded body.

2. The method of claim 1, wherein the bulk predetermined density is selected in the range of between about 0.013 $g/cm^3$ to about 0.5 $g/cm^3$.

3. The method of claim 1, wherein the step of combining further includes mixing said first and second polymer materials in a mixing jar, wherein said jar has internal baffles or helical fins for mixing said materials.

4. The method of claim 3, wherein said mixing jar is rotated on a rotary mill for about at least 3 hours.

5. The method of claim 1, wherein said temperature is a temperature selected between about 130° C. to about 150° C.

6. The method of claim 1, wherein said temperature is about 150° C.

7. The method of claim 1, wherein the step of closing further comprises non-hermetically sealing said mold.

8. The method of claim 1, wherein the thermally expandable microballoons comprise a mixture of polyacrylonitrile, polymethacrylonitrile, and isopentane.

* * * * *